Patented Aug. 22, 1944

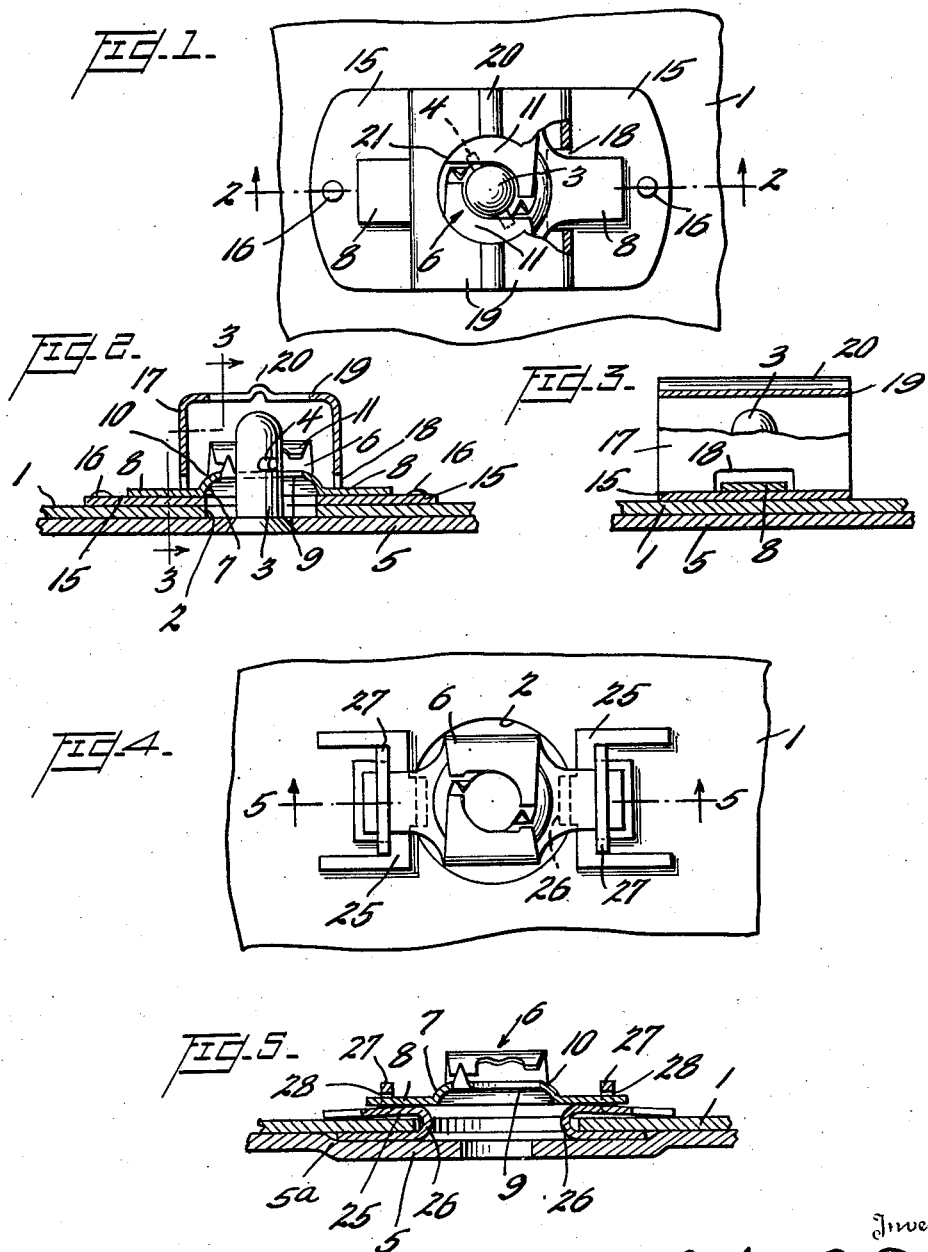

2,356,412

UNITED STATES PATENT OFFICE 2,356,412

SHIFTABLE COWL FASTENER AND INSTALLATION THEREOF

Walter I. Jones, Belmont, Mass., assignor to United-Carr Fastener Corporation, Cambridge, Mass., a corporation of Massachusetts Application September 14, 1942, Serial No. 458,197

3 Claims. (Cl. 24—221)

The present invention relates to fastener installations of the rotary stud type adapted for interlocking cooperation with a socket member attached to an apertured support.

This invention aims to improve existing fasteners of this type, particularly in providing improved means for shiftably mounting the socket member on the support so as to facilitate alignment of the stud and socket, as well as relative movement of the interlocked stud and socket relative to the support to compensate for vibration as well as relative movement between the support and supported members.

Other aims and objects of the invention will be apparent from the following detailed description of the embodiments of the invention illustrated in the drawing, wherein Fig. 1 is a plan view of a fastener secured installation as viewed from the female fastener side thereof;

Fig. 2 is a longitudinal sectional view thereof as taken on the line 2—2 of Fig. 1;

Fig. 3 is a transverse sectional view as taken on the line 3—3 of Fig. 2;

Fig. 4 is a plan view of a modified form of attaching plate according to the invention; and Fig. 5 is a sectional view taken on the line 5—5 of Fig. 4.

Fasteners of the type disclosed herein are extensively used in the construction of aircraft to securely attach one sheet, as, for example, a cowling sheet to an underlying support. The support, as indicated at 1 in the drawing, is apertured as at 2 for the reception of a rotary stud 3 having a lateral projection or arm 4, for example, a radial pin, said stud being rotatably mounted in the part 5 which may be the cowling or like sheet to be attached to the support. A female fastener or socket member 6 is suitably attached to the rear face of the support and is adapted to receive and interlock with the arms 4 of the stud 3 upon turning movement of the latter. This type of fastening has proved highly effective to hold the parts 1 and 5 together under excessive forces tending to separate them.

In many fastener installations in aircraft, the parts secured together must be capable of relative flexibility or slippage, and hence at least one member of the fastener must be bodily shiftable relative to its attached supporting part. Also, frequently it is difficult to accurately pre-locate all fastener-receiving apertures, and in assembly of the parts of the fastener it is desirable that at least one of the fastener parts be shifable so as to avoid the necessity of bending or distorting one or both of the parts. Furthermore, there is considerable vibration present in aircraft when in flight, and it is desirable to provide a substantially floatable mounting for one of the fastener parts, so that the fastener assembly when in locked position will have a limited rotation as a whole without rotating the stud relative to the socket in unlocking position.

The female fastener member or socket device may be of any of the approved forms of sheet metal devices commonly used as socket members of cowling fasteners. Preferably the member 6 is of the type shown in the copending application of William A. Bedford, Jr., Serial No. 420,554, filed November 26, 1941, Patent Number 2,306,928, granted Dec. 29, 1942. It advantageously is formed of a single piece of metal having a base portion 7, preferably elongated to provide spaced bearing sections 8 at the ends and an intermediate stud-receiving aperture 9. Portions of the base surrounding the aperture 9 are dished outwardly providing a raised cam seat or embossment 10 adapted to be engaged by the arms 4 of the stud 3 when the latter is rotated a partial revolution. The female member or socket device may also be provided with integral locking means 11 overlying the cam seat 10, as disclosed in the said Bedford application above mentioned.

According to the invention the female or socket member 6 is loosely and shiftably attached to the support 1 by means of an attaching or retainer member in such a way as to permit lateral shifting of the member 6 relative to the support aperture 2 so as to effect ready alignment between the member 6 and the stud 3 on the part 5 to be attached to the support.

Preferably the attaching member comprises a frame comprising spaced base portion 15 adapted to be fixedly attached to the support 1 as by rivets 16 and integral upstanding sides 17 having a horizontally elongated slot 18 for loosely receiving the spaced bearing sections 8. The upstanding sides 17 may be integrally connected together by a bridge portion 19 having a hinge section 20 so that the sides may be readily bent apart to permit of the insertion of the bearing sections 8 in the slots 18 prior to application of the socket member 6 and attaching member to the support. The material cut from the sides 17 in forming the slots is advantageously bent downwardly in the plane of the base to provide with the base relatively large supporting surfaces for the bearing sections 8. Preferably the bridge portion 19 is apertured as at 21 to receive the end of the stud 3.

When the socket member 6 is assembled in the attaching member with the end bearing sections 8 loosely positioned in the slots 18 of the upstanding sides 17, it is free to shift laterally of the opening 2 in all directions. Because of this loose or floating mounting, the socket member 6 may be shifted readily into alignment with the stud 3 to facilitate assembly of the fastener. When in locked position the interlocked stud 3, supported part 5 and socket 6 may shift laterally relative to the support 1, to allow for weaving or relative shifting between the parts 1 and 2 in use. Also the interlocked fastener parts may have a limited rotary movement in either direction about the axis of the stud, when the fastener installation is subjected to vibration.

The attaching means need not necessarily be riveted to the support nor be of one-piece construction as shown in Figs. 1 to 3. Instead, a plurality of separate attaching means may be provided, each supplying a supporting surface for a predetermined portion of the bearing section of the socket member as shown in Figs. 4 and 5. According to this form of the invention, each attaching member comprises a base portion 25 providing a supporting surface, and having at one end an integral depending hook 26 designed to be hooked over the edge of the support aperture 2 and held in place on the support by tensional engagement with the plate 25 and hook 26. This has the advantage in that it avoids the necessity of riveting the attaching plate to the support.

The end of the base 25 may be upturned, providing a side 27 formed with an elongated slot 28, the material from which is turned down into the plane of the base to provide a continuation of the supporting surface, as in the case of the form shown in Figs. 1 to 3. When such attaching means are employed, the hooks 26 lie beyond the outer face of the support, and the part 5 to be supported thereon may be recessed as at 5ᵃ (Fig. 5) so that the part 5 will, as a whole, be in flush tight contact with the support 1.

Although I have illustrated and described preferred embodiments of my invention, I do not wish to be limited thereby because the scope of my invention is best defined by the following claims.

I claim:

1. In a fastener for cowling and the like for attachment to an apertured support, a sheet metal fastener element comprising a base portion having spaced bearing sections and outwardly spaced apertured cam and seat means intermediate said bearing sections and adapted to interlock with a cooperative rotary stud member upon partial turning movement of the latter, and an attaching member to hold the sheet metal fastener element in place for receiving the stud member, said attaching member including spaced feet portions for rigid attachment to said supports and intermediate hingedly connected bridge portions providing an apertured enclosure for loosely housing said fastener element, the sides of said housing being provided with elongated slots movable away from each other through spreading of said hinged bridge thereby receiving the bearing sections of said fastener element.

2. In a fastener for cowling and the like for attachment to an apertured support, a sheet metal fastener element comprising a base portion having spaced bearing sections and outwardly spaced apertured cam and seat means intermediate said bearing sections and adapted to interlock with a cooperative rotary stud member upon partial turning movement of the latter, and attaching means adapted to be secured to said support to hold the sheet metal fastener element in place for receiving the stud member, said attaching means having base sections providing wear surfaces for said bearing sections, a side portion of said attaching means provided adjacent to each wear surface and having a fastener-receiving elongated aperture of greater dimensions than said fastener-bearing section entering said aperture thereby loosely receiving said sections whereby said fastener element may be shiftably attached to said support over the aperture thereof.

3. In a fastener for cowling and the like for attachment to an apertured support, a sheet metal fastener element comprising a base portion having spaced bearing sections and outwardly spaced apertured cam and seat means intermediate said bearing sections and adapted to interlock with a cooperative rotary stud member upon partial turning movement of the latter, and an attaching member to hold the sheet metal fastener element in place for receiving the stud member, said attaching member including spaced feet portions for rigid attachment to said support, said attaching member being formed with slotted portions for loosely receiving the bearing sections of said fastener element whereby the fastener element is shiftably attached to the support and an intermediate hingedly connected bridge portion overlying said fastener element and providing for movement of said feet and slotted portions away from each other to permit assembly of said fastener element with said attaching member.

WALTER I. JONES.